J. B. RAMER.
EQUALIZING AND STEERING GEARING FOR MOTOR VEHICLES.
APPLICATION FILED MAY 24, 1921.
1,424,118.
Patented July 25, 1922.
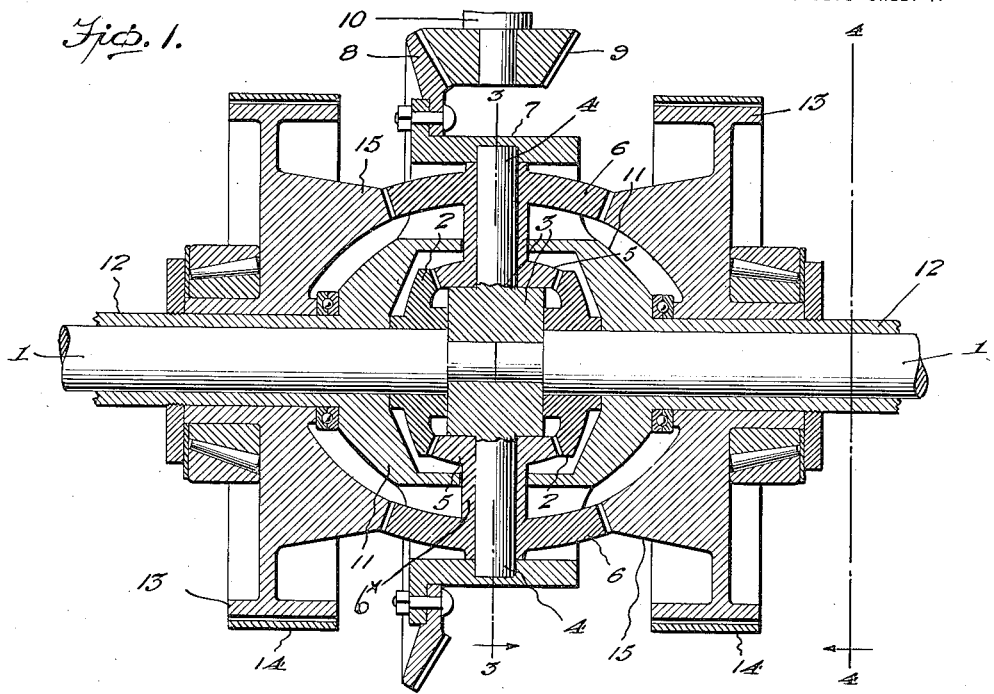
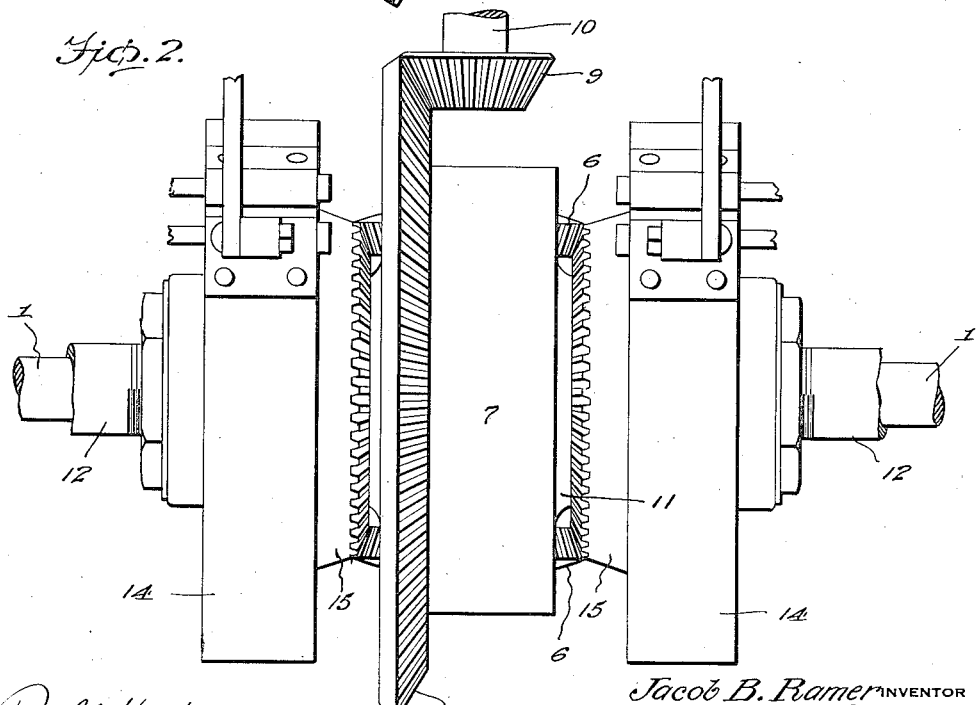

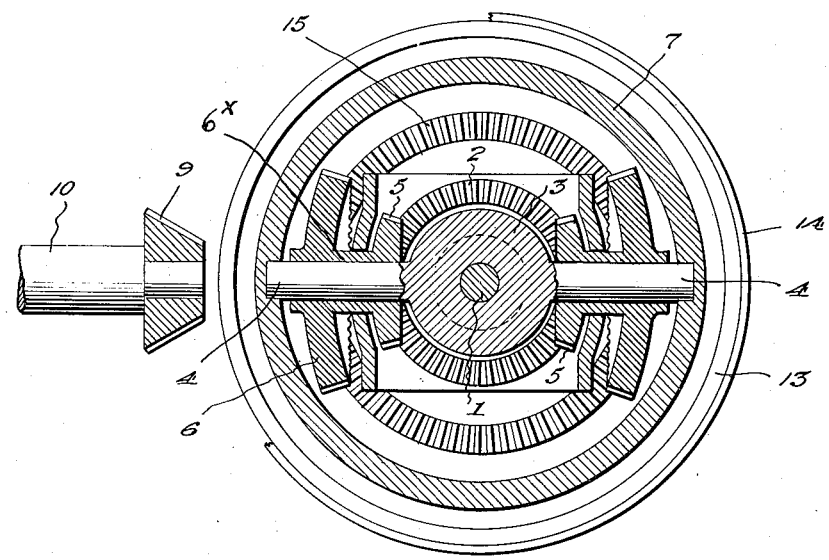
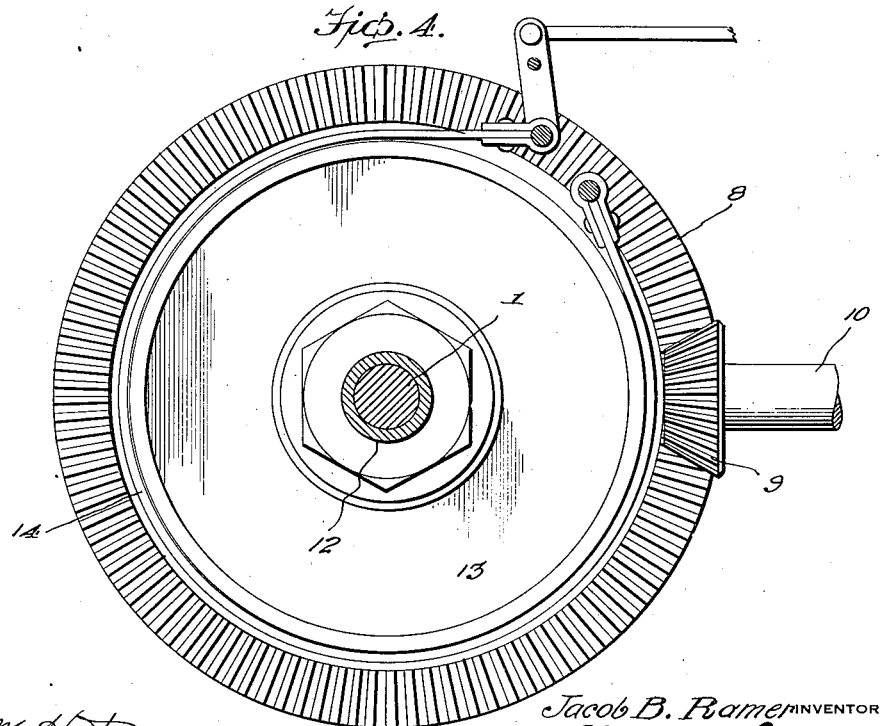

UNITED STATES PATENT OFFICE.

JACOB B. RAMER, OF CHAMBERSBURG, PENNSYLVANIA.

EQUALIZING AND STEERING GEARING FOR MOTOR VEHICLES.

1,424,118.  Specification of Letters Patent.  Patented July 25, 1922.

Application filed May 24, 1921. Serial No. 472,180.

*To all whom it may concern:*

Be it known that I, JACOB B. RAMER, a citizen of the United States, residing at Chambersburg, in the county of Franklin and State of Pennsylvania, have invented new and useful Improvements in Equalizing and Steering Gearing for Motor Vehicles, of which the following is a specification.

The object of my present invention is the provision of an equalizing gearing equipped with improved means for facilitating the steering of an automobile.

To the attainment of the foregoing, the invention consists in the improvement as hereinafter described and definitely claimed.

In the accompanying drawings, forming part hereof:—

Figure 1 is a diametrical section illustrative of my improvement.

Figure 2 is an elevation of the improvement taken in a plane parallel to that of Figure 1.

Figure 3 is a section taken at right angles to Figure 1 and in the plane indicated by the line 3—3 thereof.

Figure 4 is a section taken in the plane indicated by the line 4—4 of Figure 1, looking toward the left.

Similar numerals of reference designate corresponding parts in all of the views of the drawings.

My improvement is associated with the rear axles 1 of a motor vehicle which axles have fixed thereto gears indicated by 2. Loosely mounted upon the inner opposed portions of the axles 1 is a rotatable member 3 with which are integral the inner end portions of shafts 4. Inner gears 5 and outer comparatively large gears 6 are loose on shafts 4, said gears 5 and 6 being connected by sleeves 6ˣ. At their outer ends the shafts 4 are disposed in an annulus 7, and the said annulus 7 is provided with an annular gear 8 or is otherwise adapted to be connected with a motor. In the present embodiment a pinion 9 is intermeshed with the annular gear 8 and is carried by a shaft 10 that is adapted to be properly connected with a motor (not shown). All of the gears referred to are of bevel type, and it will be readily understood that when the vehicle is moving in a straight line the gears 2 and the axles or shaft 1 will be rotated at a common rate of speed whereas when the vehicle is making a turn, the inner axle 1, with reference to the direction of the turn, will be idle or will be rotated at a low rate of speed while the outer axle or shaft 1 will be rotated at a comparatively high rate of speed.

Loosely arranged on the axles 1 and enclosing the gears 2 and 5 are housing sections 11. These housing sections 11 are provided with outwardly extending sleeves 12, and loosely mounted on the said sleeves 12 are brake wheels 13. Each of the brake wheels 13 is disposed within a brake band 14, and each wheel is equipped with an inwardly extending annular bevel gear portion 15. These annular bevel gear portions 15 are arranged at opposite sides of and are intermeshed with the comparatively large bevel gears 6 of the shafts 4. From this it follows that when the operator of the vehicle is desirous of turning the same toward the left it is simply necessary for the operator to tighten the band 14 about the left hand brake wheel 13 whereupon the said wheel 13 will be retarded for the purpose stated. On the other hand when it is desired to turn the vehicle toward the right, the right hand brake wheel 13 is retarded in the manner stated.

It will be apparent from the foregoing that my improvement is simple and compact in construction, is reliable in operation and is well adapted to withstand the rough usage to which devices of corresponding character are ordinarily subjected.

Having described my invention, what I claim and desire to secure by Letters Patent, is:—

Equalizing and steering gearing for motor vehicles comprising axles arranged in alinement and opposed relation, bevel gears fast on said axles, a rotary member between said gears and loose upon the inner opposed portions of the axles, an annulus surrounding and spaced from said rotary member, shafts extending between and carried by the rotary member and the annulus, inner bevel gears on said shafts intermeshed with the gears fast on the axles, outer comparatively large bevel gears on the shafts and fixed to said inner gears, housing sections enclosing the gears on the axle and the gears intermeshed therewith and having sleeves receiving the axles, said housing sections having their inner portions arranged between the inner and outer gears on the shafts, brake wheels loosely mounted on the said sleeves and having inwardly extending annular bevel gear portions surrounding the housings and intermeshed with the comparatively large outer gears on the shafts, and manually-controlled means complementary to the brake wheels and independently operable to retard either brake wheel.

In testimony whereof I affix my signature.

JACOB B. RAMER.